United States Patent [19]

Urbach

[11] Patent Number: 5,835,204
[45] Date of Patent: Nov. 10, 1998

[54] LASER RANGING SYSTEM

[75] Inventor: Israel Urbach, Haifa, Israel

[73] Assignee: State of Israel/Ministry of Defense, Haifa, Israel

[21] Appl. No.: 771,346

[22] Filed: Dec. 16, 1996

[30] Foreign Application Priority Data

Dec. 18, 1995 [IL] Israel ........................................ 116438

[51] Int. Cl.$^6$ ...................................................... G01C 3/08
[52] U.S. Cl. ........................ 356/5.01; 356/4.01; 356/5.04
[58] Field of Search ................................. 356/4.01, 5.01, 356/5.03, 5.04; 250/332

[56] References Cited

U.S. PATENT DOCUMENTS

| 5,446,529 | 8/1995 | Stettner et al. | 356/4.01 |
| 5,475,225 | 12/1995 | Stettner | 250/370.11 |
| 5,696,577 | 12/1997 | Stettner et al. | 356/4.01 |

*Primary Examiner*—Mark Hellner
*Attorney, Agent, or Firm*—Ladas & Parry

[57] ABSTRACT

A laser ranging system which includes a laser pulse emitter, an imaging and impingement detecting amplifier and a system processor is provided. The laser pulse emitter produces a pulse of light to be reflected by at least one object at an unknown distance from the laser emitter. The detecting sensor has a multiplicity of photoelements and collects reflected light from the object. The detecting sensor determines the intensity of the reflected light and the time it first impinged on each of the photoelements. The system processor controls the laser pulse emitter and the detecting sensor. The system processor also receives output from the detecting sensor to produce at least distance indications for the object based on the length of time from emission of the pulse of light to receipt of its reflection as sensed by each of the photoelements.

6 Claims, 5 Drawing Sheets

5,835,204

LASER RANGING SYSTEM

FIELD OF THE INVENTION

The present invention relates generally to semiconductor light sensors for use in sensing time of flight (TOF) of a light pulse and, in particular, to such sensors formed of charge coupled devices (CCDs), charge injection devices (CIDs) or MOS transfer devices like active pixel sensors (APS).

BACKGROUND OF THE INVENTION

Charge transfer linear image sensors, otherwise known as CCDs, have been known in the art since 1968. Since then, the speed of the sensors has increased and the quality has improved through innovations such as antiblooming and electronic integration control. Other sensors, known in the art, include charge injection devices (CIDs). Further improvements include low noise output amplifiers, such as floating gate amplifiers (FGAs) and distributed floating gate amplifiers (DFGAs). Recent improvements include very fast MOS switching devices like the active pixel sensor (APS).

CCDs and CIDs are typically formed into rows of photosensitive elements, or pixels, each of which is an active device. The arrays operate in three time periods, that of integration, transfer and readout. During integration, each pixel produces charge as a result of the amount of light impinging upon it during the integration period. During transfer the charges are transferred to analog shift registers. During readout, the charge is transferred to an output shift register.

Since CODs and CIDs integrate the amount of light which Impinges upon them, they do not provide an indication of the time the energy pulse was a light pulse. Thus, if one pixel received a strong pulse of light and another received a steady, low intensity illumination during the same integration period, it is possible that the output of both pixels would be the same. Thus, if all the pixels recorded during the integration time appear at the output at almost the same time, the moment of impingement can occur at any time during integration and thus, is not known with certainty.

As a result, CCDs and CIDs are not utilized in laser ranging units (which measure distance to an object by emitting a pulse of light and by measuring the elapsed time until the reflected light pulse is received). Standard CCDs and CIDs, since they integrate the light, cannot indicate the moment when the reflected light pulse was received.

U.S. Pat. No. 5,086,342 describes a charge transfer image sensor which includes an avalanche diode as an optical shutter. Like a shutter, the avalanche diode controls when the charge carriers responding to the light impinging upon the device can be transferred to the CCD-like device.

It is noted that the shutter of U.S. Pat. No. 5,086,342 controls when the period of time (integration time) the light is sensed by the CCD-like device but it does not indicate the moment when a light pulse was first received.

SUMMARY OF THE PRESENT INVENTION

It is an object of the present invention to provide a charge transfer linear imaging device which both integrates the light and provides an indication of when, during an integration period, the light first impinged upon the device.

There is therefore provided, in accordance with a preferred embodiment of the present invention, a laser ranging system which includes: a laser pulse emitter, an imaging and impingement detecting amplifier and a system processor. The laser pulse emitter produces a pulse of light to be reflected by at least one object at an unknown distance from the laser emitter. The detecting sensor has a multiplicity of photoelements and collects reflected light from the object. The detecting sensor determines the intensity of the reflected light and the time it first impinged on each of the photoelements. The system processor controls the laser pulse emitter and the detecting sensor. The system processor receives output from the detecting sensor thereby to produce at least distance indications for the object based on the length of time from emission of the pulse of light to receipt of its reflection as sensed by each of the photoelements.

Additionally, in accordance with a preferred embodiment of the present invention, the detecting sensor includes the photoelements, a register cell per photoelement, an impingement detecting amplifier per photoelement and at least one line output amplifier. The photoelements convert light to charge. The register cells are formed into at least one shift register array, and receive charge from their corresponding photoelements during an integration period only. The impingement detecting amplifiers are connected to their corresponding register cells and measure the charge level of its corresponding photoelement during the integration period. The line output amplifier is connected to the shift register array during a readout period and provides, in sequence, charge level indications for the register cells.

Moreover, in accordance with a preferred embodiment of the present invention, the shift register array is formed into two shift register arrays respectively connected to even and odd photoelements via even and odd gates.

Finally, in accordance with a preferred embodiment of the present invention, the system processor includes apparatus for determining the distance of the object as a function of the elapsed time between emission of the laser pulse and the output of the impingement detecting amplifiers.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

Figure 1:
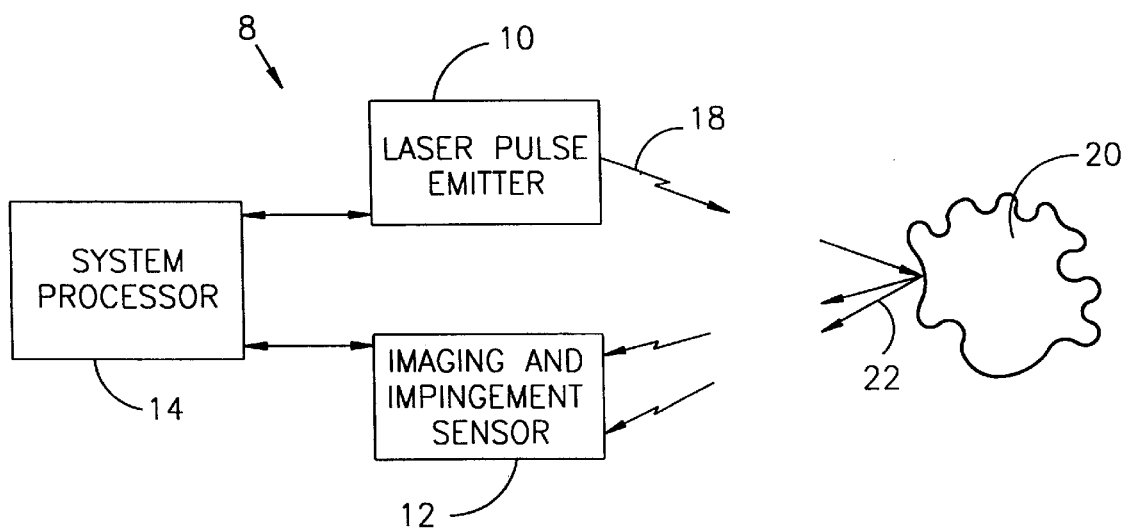
FIG. 1 is a schematic illustration of a laser ranging apparatus having an imaging and impingement sensor constructed and operative in accordance with a preferred embodiment of the present invention.
Figure 2A:
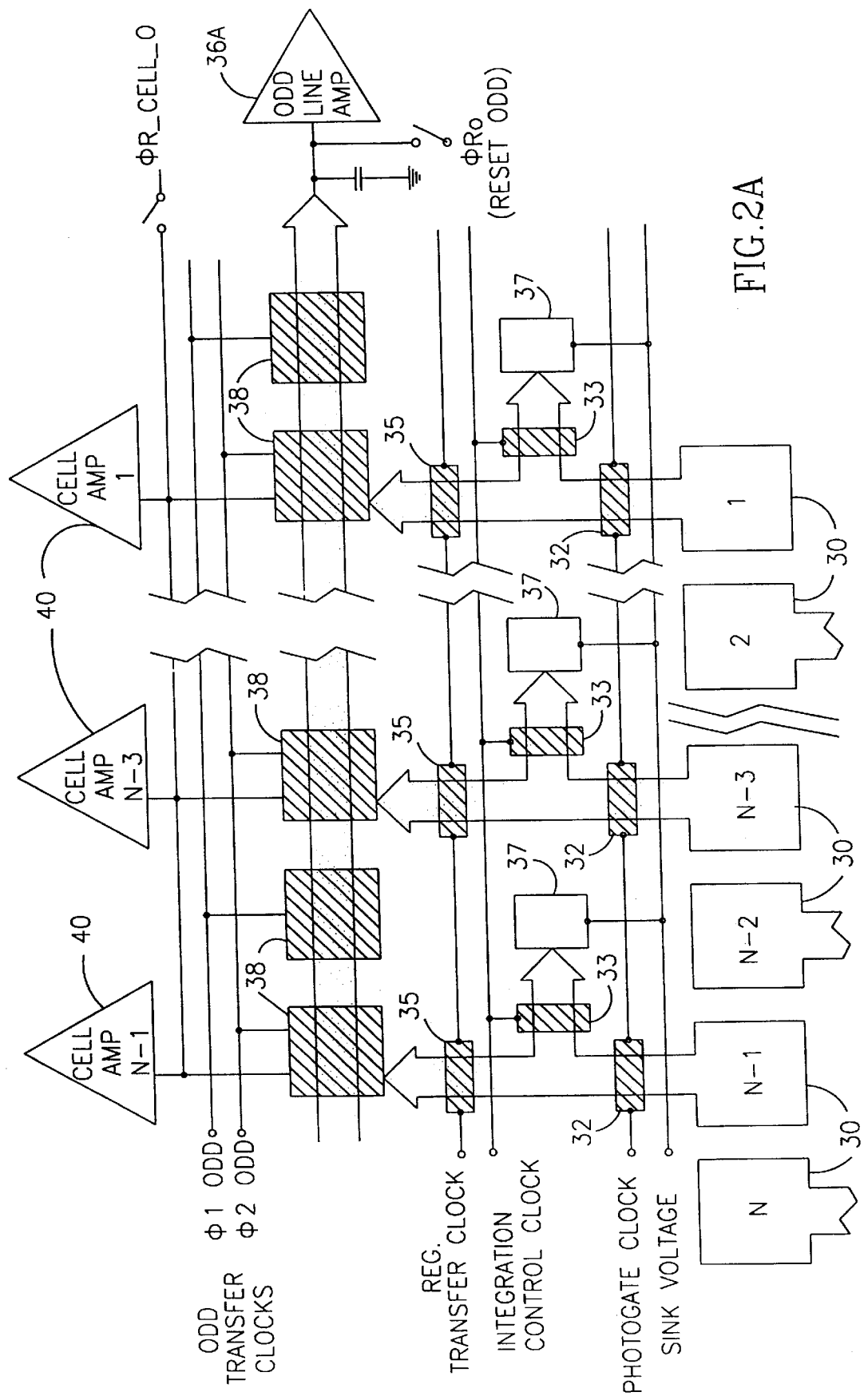
FIGS. 2A and 2B together are a schematic illustration of the sensor utilized in the apparatus of FIG. 1.
Figure 2B:
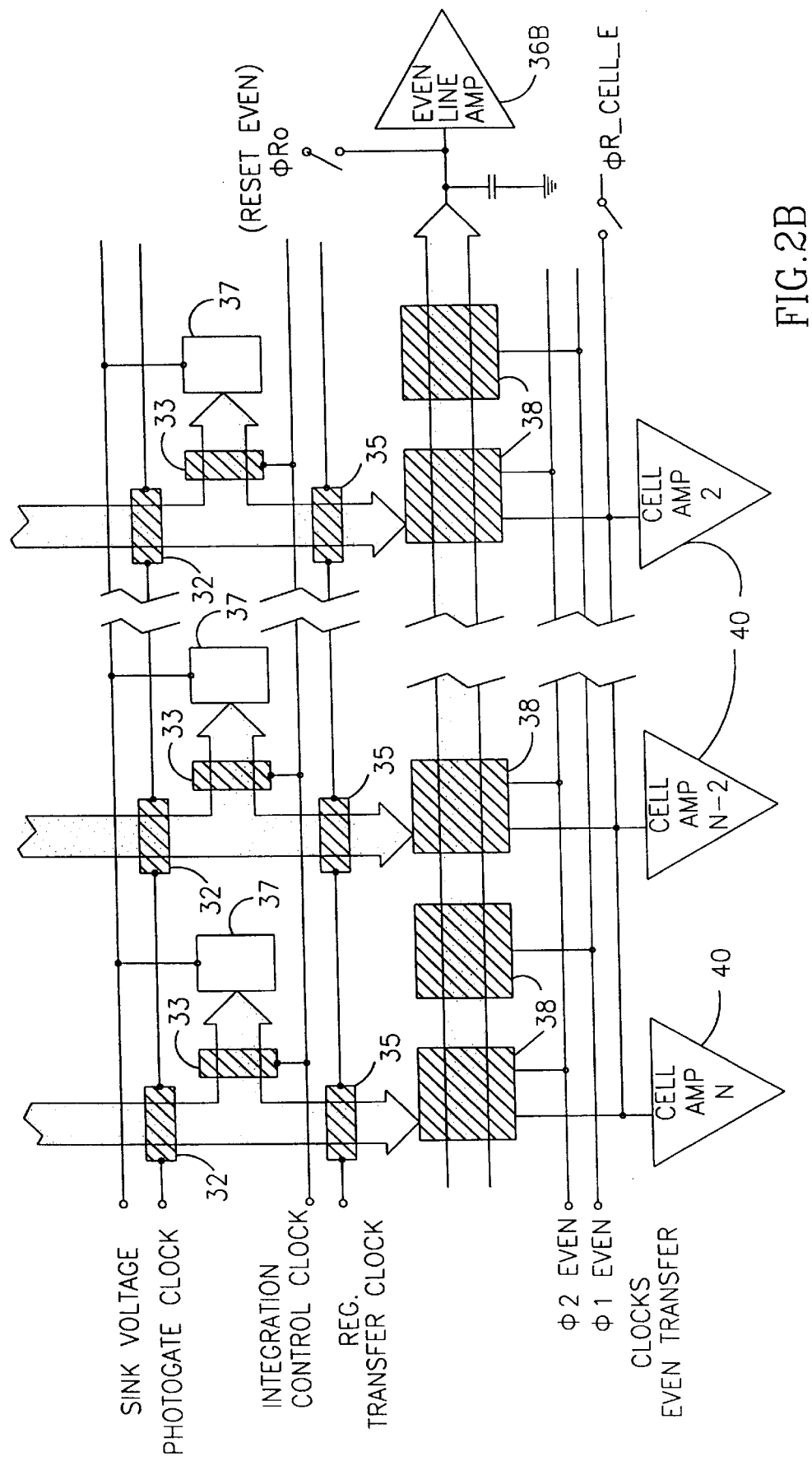
Figure 3A:
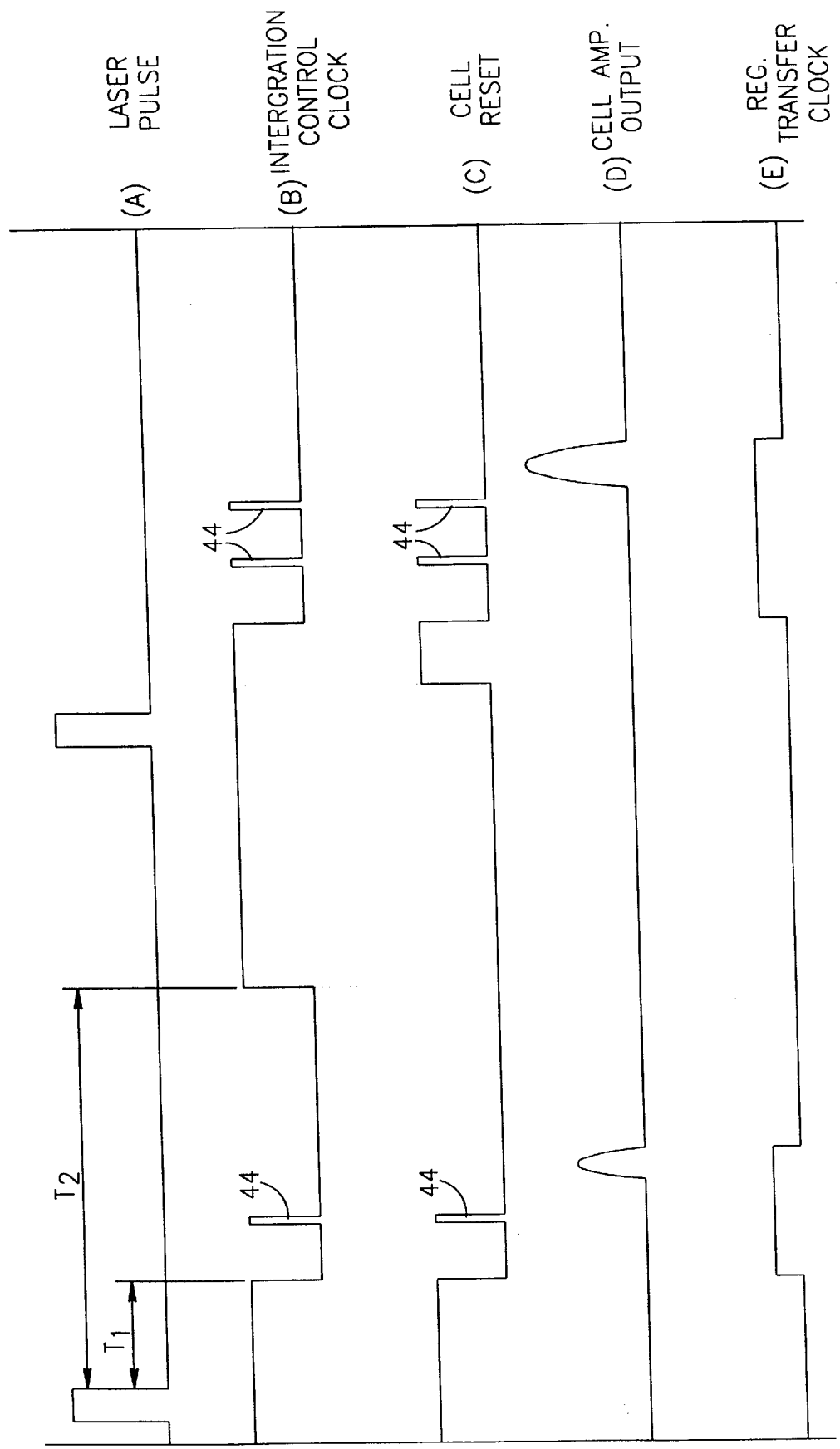
FIGS. 3A and 3B are timing diagrams of the operation of the sensor of FIGS. 2A and 2B.
Figure 3B:
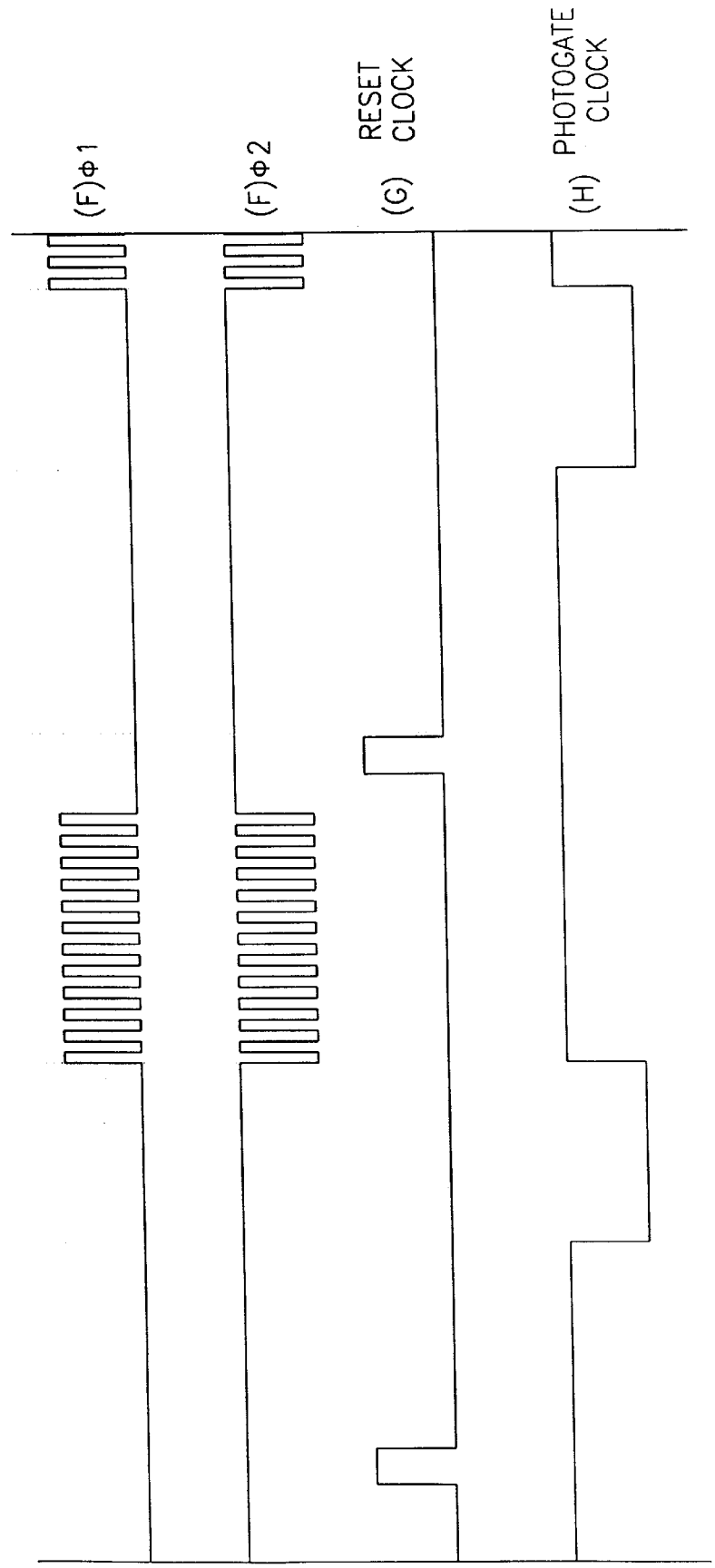

Reference is now made to FIGS. 1, 2A and 2B which illustrate the present invention. FIG. 1 shows a laser ranging apparatus having an imaging and impingement sensor, constructed and operative in accordance with a preferred embodiment of the present invention, which is illustrated in detail in FIGS. 2A and 2B, together. Reference is also made to FIG. 3 which provides a timing diagram of the operation of the sensor of FIGS. 2A and 2B.

The laser ranging apparatus, labeled 8, typically comprises a laser pulse emitter 10 and an imaging and impingement sensor 12 and a system processor 14. The laser pulse emitter 10 emits a pulse of light 18 which impinges upon an object 20 at some unknown distance from the apparatus 8. Pulse 18 is reflected, as light beam 22, back to apparatus 8 where it is sensed by sensor 12. As will be described in more detail hereinbelow, sensor 12 comprises a plurality of elements, each of which senses the arrival of light beam 22 and also integrates the amount of light therein.

The system processor 14 controls the emission of the light pulse 18 and measures the time from emission of light pulse 18 to receipt of reflected light beam 22 at each of the elements of sensor 12. Furthermore, system processor 14 determines the intensity of light received by each element of sensor 12. Thus, system processor 14 produces images of both the distance to and the intensity of light from the object 20.

Laser emitter 10 can be any suitable emitter, such as the CVD 352/354 or MH 167/6 by Laser Diode Inc. of New Brunswick, N.J., USA., which provides a pulse of light at a wavelength which sensor 12 can detect.

As shown in FIGS. 2A and 2B, sensor 12 is similar to a charge coupled device (CCD) in that it comprises a multiplicity N of photoelements 30, shift register cells 38 and line output amplifiers, generally designated 36. In FIGS. 2A and 2B, the shift register cells 38 are shown divided into two groups, one group operating in conjunction with the odd photoelements 30 and one group operating in conjunction with the even photoelements 30. For each group, there is one line output amplifier 36, labeled 36A and 36B, for the odd and even groups, respectively.

In accordance with a preferred embodiment of the present invention, the sensor 12 additionally comprises a multiplicity of "cell" or "impingement detecting" amplifiers 40, one per register cell 38. The cell amplifiers 40 continually measure the amount of charge in the register cells 38 to which they are connected and therefore, if a cell amplifier 40 is individually and continually connected to its associated register cell 38, the cell amplifier 40 can be utilized to sense the charge level of the individual photoelements 30. Thus, since a change in charge level only occurs when the photoelements 30 have been illuminated by light, such as reflected light beam 22, the change indicates the time at which reflected light beam 22 returned from the object 16. Furthermore, cell amplifiers 40 do not affect the charge level during measurement and thus, the sensor can also be utilized, through line output amplifiers 36, as a CCD to measure the intensity of the reflected beam.

The output of the cell amplifiers 40 is provided to system processor 14 which determines therefrom the cell amplifier 40 which first indicated a change. From the output of the selected cell amplifier 40, system processor 14 then determines the elapsed time and from that, determines the distance to the object 20.

For each photoelement 30, there is a photogate 32, an integration control gate 33, a transfer gate 35 and a sink 37. Each photoelement 30 is connected to its corresponding register cell 38 via its corresponding gate 32. The arrays of shift register cells 38 are connected to their corresponding line output amplifiers 36A and 36B, respectively. The following control signals are present:

a photogate clock controlling the photogate 32;
an integration control clock controlling the integration control gate 33;
a register transfer clock controlling the transfer gate 35;
even transfer clocks φ1e and φ2e;
odd transfer clocks φ1o and φ2o;
odd and even reset clocks φro and φre; and
even and odd cell reset clocks φr_cell_e and φr_r cell_o.

The operation of sensor 12 is provided hereinbelow, with respect to FIG. 3, for the even photoelements 30. It will be appreciated that sensor 12 performs the same operations for the odd photoelements except at different times. Typically, the sink time of the even photoelements is during the integration time of the odd photoelements, and vice versa.

In FIG. 3, graph (a) indicates the timing of a transmitted laser pulse 18, graph (b) indicates the timing of the integration control clock, graph (c) indicates the timing of the cell reset φr_cell_e, graph (d) indicates the output of one cell amplifier 40, graph (e) indicates the timing of the register transfer clock, graph (f) indicates the timing of the even transfer clocks φ1e and φ2e, graph (g) indicates the timing of the reset clock φre, and graph (h) indicates the photogate clock.

The laser pulse is emitted at predefined intervals (graph a). At some pre-selected time interval $T_1$ after the laser pulse has been emitted, integration begins. Typically, $T_1$ is selected based on the closest expected location of the object 20.

During integration, the photogates 32 and the transfer gates 35 of the even photoelements 30 are "open" and the integration control gates 33 are closed, as indicated by graphs (h), (e) and (b), respectively. Therefore, the charge is accumulated in the corresponding register cells 38 rather than in the photoelements as occurs in prior art CCDs. As a result of this arrangement of the gates, the even cell amplifiers 40 are continually connected to the even register cells 38 which receive the charge as the even photoelements 30 produce it. Therefore, the even amplifiers 40 provide an output signal (graph d), of the changing charge level of the even photoelements 30. The system processor 14 separately processes the output signals of the amplifiers 40 to determine when a significant change, indicating the impingement of light, has occurred thereon.

During integration, and until the system processor 14 indicates that the first light pulse has impinged on a photoelement 30, the integration control clock and the cell reset clock φr_cell_e periodically reset, for 50 nanoseconds, the photoelements 30 and cell amplifiers 40, respectively. This involves opening the integration control gates 33 and dumping the charge accumulated within the photoelements 30 to the sink 37. Similarly, cell reset φr_cell_e removes the charge accumulated in the amplifiers 40. The resetting reduces the amount of background noise and occurs on the order of every 500–1000 nanoseconds. It is indicated by spikes 44 of graphs (b) and (c).

Once a signal is detected, the integration control clock and the cell reset clock φr_cell_e no longer reset the photoelements 30 and the cell amplifiers 40, respectively, and integration is allowed to continue (integration control gates 33 remain open and the cell reset signal remains low). However, as shown in graphs (h) and (e), the photogate clock and register transfer clock close the photogate 32 after the last signal is detected or the beginning of the readout period. As indicated in graphs (h) and (e), the photogate 32 is open from the beginning of the integration activity until the system processor 14 indicates that last received light pulse has impinged, or until the beginning of the readout period.

At the end of the integration activity, the register transfer clock (graph h) closes the transfer gates 35 and the integration control clock opens the integration control gates 33. The readout period begins by the odd (even) transfer clocks (graph (f), after a time period $T_2$, representing the largest expected range to the object 20. For a range of 15 kilometers, $T_2$ is on the order of 100 μsec.

During the readout period, the even transfer clocks φ1e and φ2e transfer the accumulated charge of the register cells 38 towards the even line amplifier 36B. Any charge which accumulates during the readout period will be dumped to the sink 37 which is connected to a sink voltage line.

At the end of the even readout period, which can occur before or after a new laser pulse is emitted (FIG. 3 shows the latter case), the even reset clock φre (graph g) resets the input to the even line amplifier 36B, effectively ending the readout period. Similarly, the cell reset signal (graph c) empties the cell amplifiers 40 of any accumulated charge therein.

It is noted that, by alternating which group of photoelements 30 is integrating and detecting, the sensor 12 of the present invention continually senses the scene which has object 20 therein. It is further noted that the sensor 12 of the present invention produces two maps of the object or objects 20 at the same time, a map of their distance away (from the output of the cell amplifiers 40) and a map of their shape (from the output of the line amplifiers 36).

It will be appreciated that the sensor of the present invention can be implemented in any of a number of known ways. For example, the shift register cells 38 can have 2, 3 or 4 electrodes corresponding to 2, 3, or 4 phases, respectively.

It will be appreciated by persons skilled in the art that the present invention is not limited to what has been particularly shown and described hereinabove. Rather the scope of the present invention is defined only by the claims which follow:

I claim:

1. A laser ranging system comprising:
   A. a laser pulse emitter for producing a pulse of light to be reflected by at least one object at an unknown distance from said laser emitter;
   B. an imaging and impingement detecting sensor having a multiplicity of photoelements for collecting reflected light from said at least one object, for detecting generally in real time the impingement of said reflected light on one or many of said photoelements, and for determining the intensity of said reflected light and the time it first impinged on each of said photoelements; and
   C. a system processor for controlling said laser pulse emitter and said detecting amplifier and for receiving output from said detecting amplifier thereby to produce at least distance indications for said at least one object based on the length of time from emission of said pulse of light to receipt of its reflection as sensed by each of said photoelements.

2. A system according to claim 1 and wherein said detecting sensor comprises:
   a) said multiplicity of photoelements which convert light to charge;
   b) a multiplicity of register cells, one per photoelement and formed into at least one shift register array, wherein each register cell receives the charge from its corresponding photoelement during an integration period only;
   c) a multiplicity of impingement detecting amplifiers, each one connected to a corresponding register cell, each for measuring the charge level of its corresponding photoelement during said integration period; and
   d) at least one line output amplifier, connected to said at least one shift register array during a readout period, for providing, in sequence, charge level indications for the register cells.

3. A system according to claim 2 and wherein said at least one shift register array is two shift register arrays respectively connected to even and odd photoelements via even and odd gates.

4. A system according to claim 2 and wherein said system processor comprises means for determining the distance of said object as a function of the elapsed time from the emission of said laser pulse to the output of said impingement detecting amplifiers.

5. A system according to claim 3 and wherein said system processor comprises means for determining the distance of said object as a function of the elapsed time from the emission of said laser pulse to the output of said impingement detecting amplifiers.

6. An imaging and impingement detecting sensor for use in a laser ranging system, the sensor comprising:
   a) a multiplicity of photoelements which convert light to charge;
   b) a multiplicity of register cells, one per photoelement and formed into at least one shift register array, wherein each register cell receives the charge from its corresponding photoelement during an integration period only;
   c) a multiplicity of impingement detecting amplifiers, each connected to a corresponding register cell, each for measuring the charge level of its corresponding photoelement during said integration period; and
   d) at least one line output amplifier, connected to said at least one shift register array during a readout period, for providing, in sequence, charge level indications for the register cells.

* * * * *